United States Patent [19]

Van Scoy

[11] 4,410,010
[45] Oct. 18, 1983

[54] ORIFICE METER WITH ISOLATION CHAMBER SEAL ON THE ORIFICE DISC CARRIER

[75] Inventor: Davis A. Van Scoy, Simonton, Tex.

[73] Assignee: Grove Valve and Regulator Company, Oakland, Calif.

[21] Appl. No.: 346,485

[22] Filed: Feb. 8, 1982

[51] Int. Cl.³ .............................................. F15D 1/02
[52] U.S. Cl. .................................... 138/44; 73/861.61
[58] Field of Search ........... 73/861.59, 861.61, 861.62; 138/41, 44, 45, 94, 94.3, 94.5; 251/326, 329

[56] References Cited

U.S. PATENT DOCUMENTS

| | | | |
|---|---|---|---|
| 1,921,298 | 8/1933 | Lewis | 138/45 |
| 1,946,319 | 2/1934 | Hodgson et al. | 138/44 X |
| 2,462,493 | 2/1949 | Hamer | 138/44 |
| 2,688,987 | 9/1954 | Whalen | 138/94.3 X |
| 4,014,366 | 3/1977 | Critendon | 138/44 |
| 4,355,656 | 10/1982 | Smith | 138/94 X |
| 4,370,893 | 2/1983 | Combes | 73/861.61 |

FOREIGN PATENT DOCUMENTS 288930  4/1928  United Kingdom ............. 73/861.61

Primary Examiner—Stephen Marcus
Assistant Examiner—Mark Thronson
Attorney, Agent, or Firm—Melvin R. Stidham

[57] ABSTRACT

An orifice meter wherein a disc carrier plate has two openings, one being a receptacle for an orifice disc and the other a through flow port. When the carrier is raised for replacement of the disc, the flow port is aligned with the flow passages. Seals around the flow port seal off the flow passages so that pipeline flow may be resumed during the orifice disc replacement.

3 Claims, 4 Drawing Figures

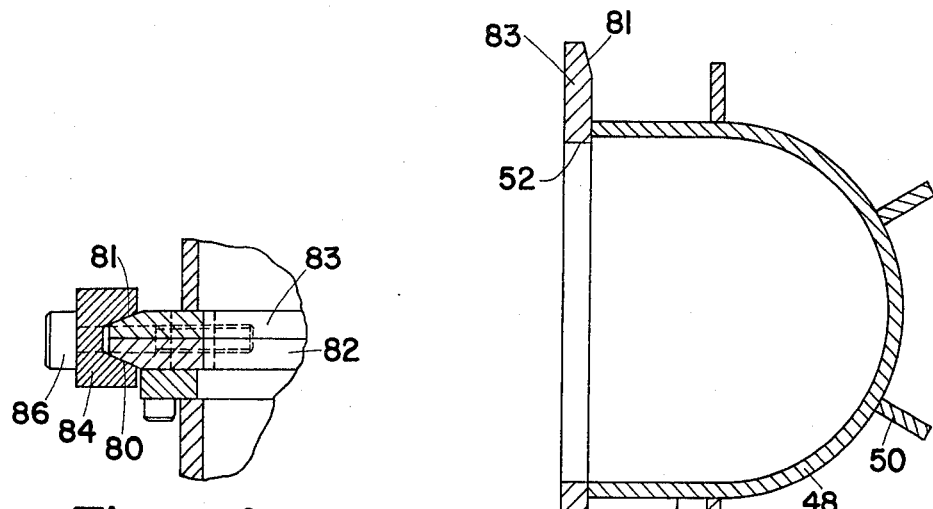
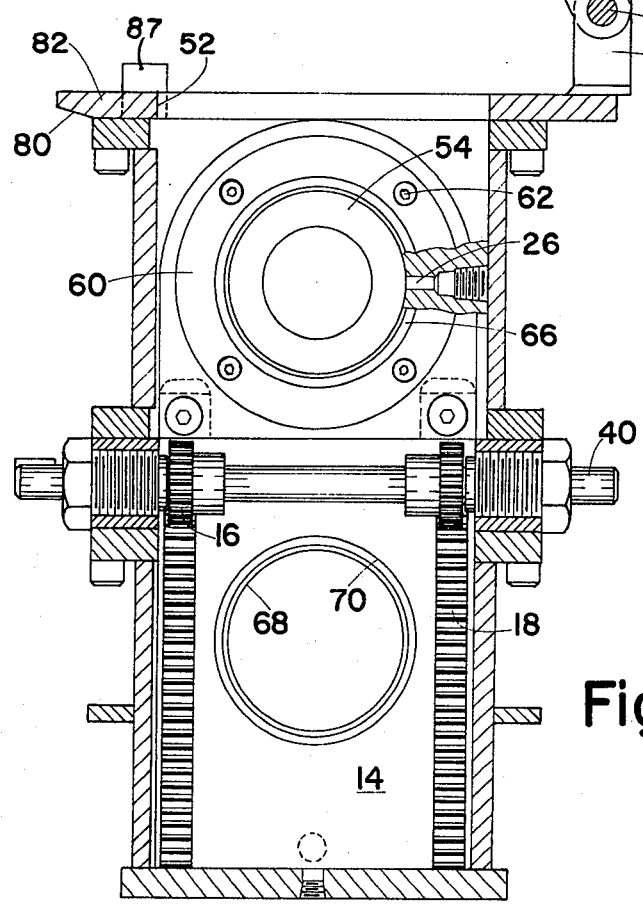
Fig. 4
Fig. 3

ORIFICE METER WITH ISOLATION CHAMBER SEAL ON THE ORIFICE DISC CARRIER

BACKGROUND OF THE INVENTION

Natural gas is generally sold by volumetric measurement, and one way to measure the volume of a flowing gas is to pass it through an orifice of a known size, and measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, line scale, and other foreign particles in the flowing stream, it must be replaced at frequent intervals to insure accuracy in measurement.

In the basic, or junior type orifice meter, the pipeline must be shut down or bypassed while the worn orifice disc is removed from the body and replaced with a new disc. In the more sophisticated or senior type orifice fittings, the orifice disc carrier is moved out of the flow passage to a displaced portion or compartment of the housing, which is then isolated from the flow passage so that flow can continue while the orifice disc is being replaced. If gas flow is continued during the time the orifice disc is being replaced, it is customary to assume a continuing, constant flow rate based on previous measurements. However, with changes in pressure and other variations that can take place in pipeline flow, it highly desirable to minimize the length of the period during which the parties rely on an unmeasured, assumed rate of flow.

OBJECTS OF THE INVENTION

It is an object of this invention to provide an orifice fitting wherein an orifice disc may be removed and replaced in a minimum amount of time.

It is a further object of this invention to provide an orifice fitting wherein the movement of the orifice disc carrier to position the orifice disc for replacement, simultaneously seals off the flow passage to enable continued flow.

It is a further object of this invention to provide an orifice meter wherein the orifice carrier may be moved to carry the orifice disc to a displaced chamber outside of the flow passage and, at the same time, seal off that chamber from gas flow in the pipeline.

Other objects and advantages of this invention will become apparent from the description to follow, particularly when read in conjunction with the accompanying drawings.

SUMMARY OF THE INVENTION

In carrying out this invention, there is provided a valve-like body including a pair of parallel plates, the inner surfaces of which form sealing surfaces. A gate-like orifice disc carrier has two openings through it, one forming a receptacle for an orifice disc and the other forming a flow opening. There are seals around both the orifice disc receptacle and the flow opening, so that whichever is in alignment with the flow passages, the seals carried thereby will isolate the flow passage from the remainder of the valve body. In normal operation, the orifice disc carrier is in alignment with the flow passage, but when it is necessary to replace the orifice disc, the carrier is moved so that the flow opening becomes aligned, whereby its seals isolate the flow passage from the remainder of the body, enabling replacement of the orifice disc through a suitable access opening.

BRIEF DESCRIPTION OF THE DRAWINGS

In the drawings:

FIG. 3 is a vertical section view taken along a plane perpendicular to the plane of FIG. 2; and FIG. 4 is an enlarged partial section view of a closure locking device.

DESCRIPTION OF A PREFERRED EMBODIMENT

Figure 1:
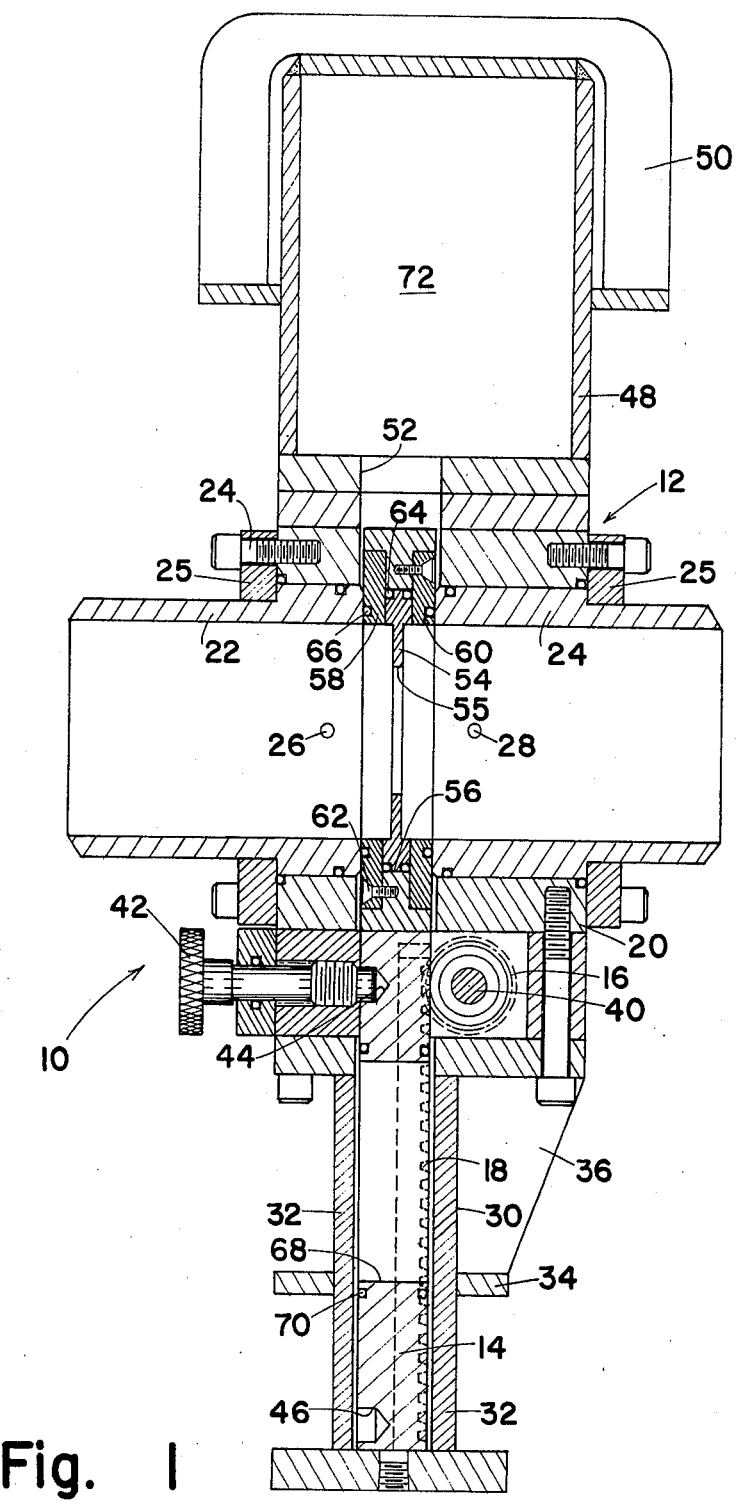
FIG. 1 is a vertical section view of an orifice meter embodying features of this invention.
Figure 2:
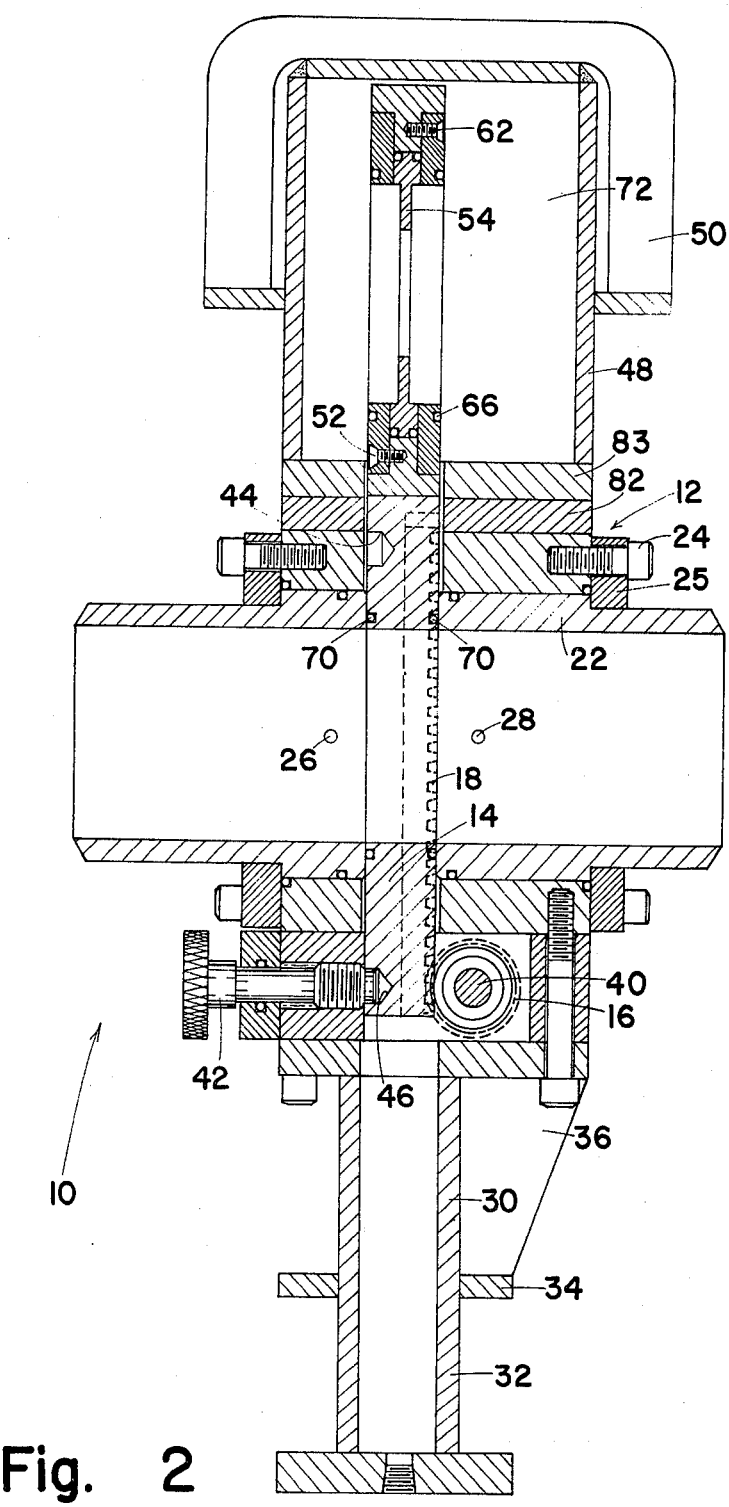
FIG. 2 is a vertical section view of the orifice meter in position for orifice disc replacement.

Referring now to FIGS. 1 and 2 with greater particularity, the orifice meter or fitting 10 of this invention comprises a housing or body member 12 in which is slideably carried a gate-like orifice disc carrier 14, which may be raised from the active position shown in FIG. 1 to the servicing position shown in FIG. 2, as by rotating a pair of pinions 16 operatively engaged with vertical racks 18, which are secured along the sides of the orifice disc carrier 14 (FIG. 3).

The orifice meter body 12 includes a central, basic fitting 20 to which upstream and downstream flow tubes 22 are secured as by means of cap screws 24 engaged in flange fittings 25 around the flow tubes 22. Upstream and downstream taps 26 and 28 are provided to measure pressures, thereby to determine the pressure drop across an orifice plate disposed between them, as will hereinafter be described.

Also comprising the body 12 is a lower housing module 30 which may comprise a pair of parallel steel plates 32, reinforced by suitable ribs 34 and gussets 36 welded to the plates 32. Carried in the lower housing module is the pinion shaft 40, which may carry the pinions 16 at either or both ends, and a position lock screw 42, which engages suitable sockets 44 and 46 to determine positively and lock the carriers in its active and servicing positions, as illustrated respectively in FIGS. 1 and 2.

A housing closure module 48, which may be reinforced by suitable ribs 50 is secured to the top of the basic fitting 20 to receive the upper portion of the orifice carrier 14 when raised to the position shown in FIG. 2. A slot 52 at the bottom of the closure module receives the orifice carrier 14 when raised and, when the carrier is in the position shown in FIG. 2, access may be provided for removal and replacement of the orifice disc 54 with its orifice opening 55.

The orifice disc 54 is received in the carrier 18 in a receptacle 56 near the upper end of the carrier 18 and is there held in place by suitable mounting plates 58 and 60, which are secured to the valve carrier 14, as by means of screws 62. Seal rings 64 around the orifice disc 54 prevent bypass flow there, and seal rings 66 on both mounting plates 58 and 60 prevent flow around the orifice carrier 14.

When the carrier 14 is raised to the position shown in FIG. 2 a second flow opening 68 is brought into alignment with the flow tubes 22 and 24 and, in that position, seal rings 70 on both sides of the valve carrier 14 seal around the flow tubes 22 and 24 to isolate them from the remainder of the valve body 12. Hence, when the carrier is in the position shown in FIG. 2, the space 72 within the closure module 48, wherein the orifice disc 54 is now positioned, is isolated from the flow passages.

Referring now to FIG. 3, a pair of hinge members 74 and 76 provided on the basic fitting and closure module, respectively, are secured together by a hinge pin 78, so that the closure module 48 may be swung to the position shown in FIG. 3 to expose the orifice disc 54 and enable quick removal of the orifice 54 by removal of the screws 62.

When the closure module 14 is again closed, wedging surfaces 80 and 81 on adjacent sides of peripheral flanges 82 and 83 around the valve body 12 and closure module 48, respectively, may be engaged by a complementary female lock 84 (FIG. 4), which is secured tightly by cap screws 86 threaded into blocks 87 to hold the closure module 48 firmly against the top flange 81 of the basic section.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. An orifice meter comprising:
   an open top main housing module having a pair of parallel plates;
   aligned flow passages through said plates;
   a lower housing module secured to and in communication with said main housing module;
   a carrier plate having a top orifice disc receptacle and a lower through flow port;
   seal rings on both sides of said carrier plate sealing against said plates around said disc receptacle and said flow port;
   said carrier plate being slidable between a lower working position and a raised servicing position in which positions, respectively, said disc receptacle and said flow port are aligned with said flow passages; and
   means for raising and lowering said carrier plate; and
   a flange plate around the top of said main housing module;
   a closure housing module hinged at one side to said flange plate;
   said closure housing module receiving said carrier plate in its servicing position; and
   clamp means for locking said closure housing firmly against said flange plate.

2. The orifice meter defined by claim 1 wherein said raising and lowering means comprises:
   a vertical rack in said carrier plate;
   a pinion rotatable in one of said main and lower housing modules engaging said rack; and
   selectively operable means for rotating said pinion.

3. The orifice meter defined by claim 1 including:
   upper and lower sockets in said carrier plate; and
   a lock pin on one of said main and lower housing modules engageable with said sockets to lock said carrier plate in said working and servicing positions, respectively.

* * * * *